Nov. 20, 1923.

J. F. BOBBITT 1,474,577

TOY VEHICLE

Filed March 29, 1922

Inventor
James F. Bobbitt

By Beall & Fenwick
Attorneys.

Patented Nov. 20, 1923.

1,474,577

UNITED STATES PATENT OFFICE.

JAMES FRANK BOBBITT, OF GREENWOOD, MISSISSIPPI.

TOY VEHICLE.

Application filed March 29, 1922. Serial No. 547,652.

*To all whom it may concern:*

Be it known that I, JAMES F. BOBBITT, a citizen of the United States, residing at Greenwood, in the county of Leflore and State of Mississippi, have invented certain new and useful Improvements in Toy Vehicles; and I do hereby declare the following to be a full, clear, and exact description of the invention, such as will enable others skilled in the art to which it appertains to make and use the same.

This invention relates to improvements in children's toy vehicles of the tricycle class, and has for its object the provision of an auxiliary seat in connection with an improved frame construction.

The present invention consists in the novel construction, arrangement and combination of parts as hereinafter more particularly described and claimed.

Figure 1:
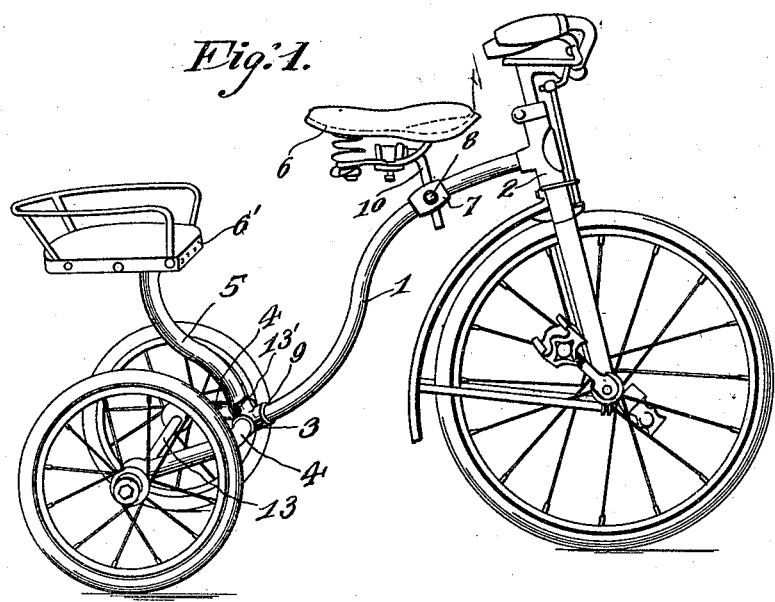
Figure 1 is a perspective view of the improved vehicle.
Figure 2:
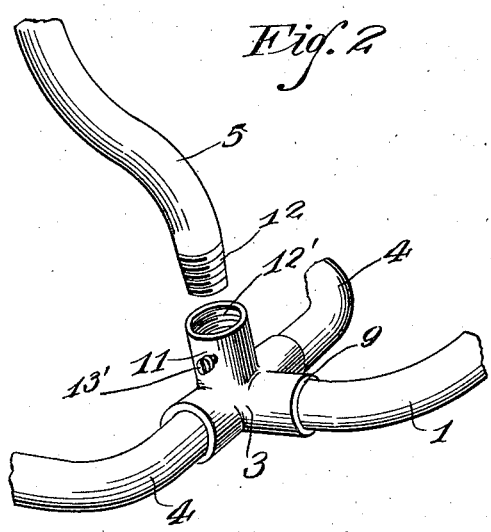
Fig. 2 is a detail view in perspective, illustrating the junction of the frame members and the support for the auxiliary seat.

Referring to the drawings, 1 indicates the main frame bar which may be made of suitable metal tubing and which is preferably S-shaped having its forward end fixedly secured to a steering head 2. The rear end of the frame member 1 is secured to a four-way junction member 3 as at 9. Laterally extending from the junction member 3 are two arcuate members 4 which are secured by their rear ends to the rear axle 13. The upwardly projecting socket 11 of the junction member 3 is interiorly threaded as at 12' to receive the threaded end 12 of an S-shaped supporting bar 5 to the upper end of which is secured an auxiliary seat 6'. A supporting member 7 is carried by the frame member 1 and is provided with a set bolt 8 to adjustably secure the supporting bar 10 of the saddle seat 6.

The frame member 1, it will be noted from the illustration, is secured with reference to the steering head 2 in such a manner that its curve conforms with that of the front driving wheel in front, while at the rear it dips to permit ready access to the auxiliary seat 6'. It will also be noted that the auxiliary seat 6' is supported on an S-shaped bar which throws said seat rearwardly and substantially above the rear axle so that the arcuate members 4 serve both to steady the frame against lateral stresses, and also as convenient foot rests for the occupant of the auxiliary seat.

In order to prevent the supporting bar 5 from becoming incidentally detached from the socket 12', a set screw 13' is carried by the socket for engagement with the threaded end of the bar when in an operative position, as shown in Fig. 1.

Having thus fully described my invention, I claim:

A tricycle comprising in combination a substantially S-shaped frame bar secured at its front end to a steering head and at its rear end to a four way junction member, laterally and rearwardly extending arcuate members secured by their front ends to said junction member and at their rear ends to the rear axle, and an auxiliary seat supported by a substantially S-shaped rearwardly inclined bar adapted to be removably secured to said junction member so that the seat is secured substantially above the rear axle of the vehicle, said S-shaped frame bar being so arranged as to conform to the curve of the front wheel and to permit ready access to the auxiliary seat to permit the occupant of the auxiliary seat to use said laterally extending arcuate members as foot rests, substantially as specified.

In testimony whereof I affix my signature.

JAMES FRANK BOBBITT.